(12) United States Patent
Ivanov et al.

(10) Patent No.: US 9,250,093 B2
(45) Date of Patent: Feb. 2, 2016

(54) NAVIGATION DEVICE, METHOD OF PREDICTING A VISIBILITY OF A TRIANGULAR FACE IN AN ELECTRONIC MAP VIEW, AND METHOD FOR GENERATING A DATABASE

(71) Applicant: Harman Becker Automotive Systems GmbH, Karlsbad (DE)

(72) Inventors: Vladimir Ivanov, Munich (DE); Viktor Samokhin, Ovidiopol (UA); Carsten-Christian Spindler, Karlsruhe (DE); Martin Fischer, Munich (DE); Alexey Pryakhin, Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 411 days.

(21) Appl. No.: 13/667,738

(22) Filed: Nov. 2, 2012

(65) Prior Publication Data
US 2013/0113796 A1  May 9, 2013

(30) Foreign Application Priority Data
Nov. 3, 2011   (EP) .................................... 11187751

(51) Int. Cl.
| G06T 17/00 | (2006.01) |
| G01C 21/36 | (2006.01) |
| G06T 17/05 | (2011.01) |
| G09B 29/12 | (2006.01) |
| G06T 15/40 | (2011.01) |

(52) U.S. Cl.
CPC ............ *G01C 21/3638* (2013.01); *G06T 15/40* (2013.01); *G06T 17/05* (2013.01); *G09B 29/12* (2013.01)

(58) Field of Classification Search
None
See application file for complete search history.

(56) References Cited

U.S. PATENT DOCUMENTS 6,137,492 A * 10/2000 Hoppe .......................... 345/420
6,208,997 B1 * 3/2001 Sigeti ................ G06F 17/30241
                                                              1/1

(Continued)

FOREIGN PATENT DOCUMENTS

WO     2009018820      2/2009

OTHER PUBLICATIONS

"Survey of semi-regular multiresolution models for interactive terrain rendering" Pajarola et al. Visual Comput Jun. 13, 2007.*
Scholar Search NPL files.*
"Survey of semi-regular multiresolution models for interactive terrain rendering" Visual Compute 2007.*
Pajarola et al., "QuadTin: quadtree based triangulated irregular networks", Annual IEEE Conference on Visualization, 2002, pp. 395-402.

(Continued)

*Primary Examiner* — Ming Hon
*Assistant Examiner* — Khoa Vu
(74) *Attorney, Agent, or Firm* — O'Shea Getz P.C.

(57) ABSTRACT

A navigation device for a vehicle comprises a database storing, for a plurality of tiles of a tiling, at least one triangulated irregular network (TIN) defining a three-dimensional surface, and, for a plurality of triangular faces of the at least one TIN, control information defining a nested bounding sphere for the respective triangular faces. The navigation device comprises a processor coupled to the database configured to calculate a screen-space error for the plurality of triangular faces based on the respective control information and based on at least one of the following: a viewing angle of an electronic map view, a virtual camera position of the electronic map view. The processor is configured to predict whether a triangular face is visible in the electronic map view based on the calculated screen-space error.

3 Claims, 8 Drawing Sheets

(56) References Cited

U.S. PATENT DOCUMENTS

2005/0253843 A1* 11/2005 Losasso Petterson et al. ............... 345/428
2006/0129320 A1* 6/2006 Lee ................. G06T 17/05 702/5

OTHER PUBLICATIONS

Vignoni et al., "Representation and visualization of terrain surfaces at variable resolution", The Visual Computer, vol. 13, 1997, pp. 199-217.

* cited by examiner

_US 9,250,093 B2_

NAVIGATION DEVICE, METHOD OF PREDICTING A VISIBILITY OF A TRIANGULAR FACE IN AN ELECTRONIC MAP VIEW, AND METHOD FOR GENERATING A DATABASE

CLAIM OF PRIORITY

This patent application claims priority from EP Application No. 11 187 751.0 filed Nov. 3, 2011, which is hereby incorporated by reference.

FIELD OF TECHNOLOGY

The invention relates to methods and devices associated with the use of height information in navigation devices. The invention relates in particular to a navigation device for a vehicle, a method of generating a database, and a method for estimating a visibility of a triangular face in an electronic map view. The invention relates in particular to such devices and methods which may be used for visualizing a three-dimensional terrain.

RELATED ART

Height information for a terrain is used increasingly in navigation devices. Such height information may be used is the outputting of three-dimensional electronic map view. Optical output units may be used for outputting electronic map views. Since electronic map views may be displayed on screens of small and/or portable devices, they have the advantage of being versatile and compact. Three-dimensional (3D) map views, i.e., perspective representations, may be of particular value to the user owing to their high recognition quality. That is, the recognition of an environmental region, such as a street intersection, may be facilitated when a three-dimensional map is output, as compared to a conventional two-dimensional representation.

Another field in which height information may be used includes navigation applications or driver assistance. For illustration, various cost functions used in route search, such as fuel consumption costs, may depend on the height difference which is to be covered. Height information allows the height differences covered upon traversal of a route to be determined. The influence of an elevation difference on fuel consumption, or on other driver assistance functions, may be taken into account.

Information about the elevation of certain geographical coordinates is obtained from a digital elevation model (DEM). A DEM comprises the raw information on the elevation as a function of position. In order to provide a 3D electronic map with a graphical representation of the elevation, the information obtained from a DEM is typically processed in order to obtain a plurality of tiles each including a triangulated irregular network (TIN). Such TINs comprise two or more triangular faces and each edge point or corner of a triangular face typically has an associated elevation. Then the TIN represents a 3D surface modelling the DEM. The tiles with associated TINs can then be rendered for providing a 3D electronic map view. The process of rendering relies on the position and orientation of a virtual camera defining the viewing perspective. It therefore relies on parameters relevant at a certain situation during the usage of the navigation system. Rendering occurs at run time, i.e., during the usage of the navigation system. In contrast to run time, the compile time relates to pre-generation of data used later on at run time.

However, the process of rendering a 3D surface comprising a number of tiles requires relatively large computational resources at run time. Due to this the performance of a navigation device using a 3D electronic map view using a terrain representation may be limited. One possibility to reduce the computational resources needed for rendering such a 3D electronic map view is to calculate a screen-space error for each triangular face. From such a screen-space error it is possible to predict the visibility of a certain triangular face in the electronic map view. Only if a certain triangular face is visible, it is taken into account when rendering the electronic map view. However, also the calculation of the screen-space error requires relatively amount of large computational resources.

SUMMARY OF THE INVENTION

According to an aspect of the invention, a navigation device for a vehicle comprises a database storing, for a plurality of tiles of a tiling, at least one triangular irregular network (TIN) defining a three-dimensional surface, and, for a plurality of triangular faces of the at least one TIN, control information defining a nested bounding sphere for the respective triangular faces. The navigation device further comprises a processor, which is coupled to the database and is configured to calculate a screen-space error for the plurality of triangular faces based on the respective control information and based on at least one of the following: a viewing angle of an electronic map view and/or a virtual camera position of the electronic map view. The processor is further configured to predict whether a triangular face is visible in the electronic map view based on the calculated screen-space error.

In this context a database may refer to structured data stored on a non-volatile memory for an extended period of time. In particular, a database may be in contrast and different to working memory, which typically comprises volatile memory with fast read and write times.

A bounding sphere of a triangular face fully comprises the triangular face while having the smallest possible volume.

The tiling and the associated TINs and triangular faces may be calculated at compile time from a DEM. Here each tiling may include a plurality of tiles. The tiles may be of square shape or rectangular shape and may relate to a certain geographical region (for which additional digital map data containing information on streets, roads, geographical features etc. may be present). Each tile may comprise two or more triangular faces. These triangular faces define the triangulated irregular network (TIN) which is associated with the tile to which the triangular faces belong to. Each triangular face has three edge points or corner points which may have associated elevation data. Thereby, a 3D surface may be defined.

The calculation of the screen-space error, which may occur at run time, may comprise parameters related to a certain electronic map view such as the viewing angle and the virtual camera position. In this sense, in contrast to an object error, the screen-space error may be dependent on the particular perspective of a certain electronic map view (and not only on the objects contained in the electronic map view). For example, objects having a large distance to the virtual camera position (i.e., objects far away from the virtual camera) may have a reduced screen-space error since the object appears smaller in the respective electronic map view. Various methods of calculating a screen-space error are known to the person skilled in the art and therefore are not discussed here in greater detail.

By storing the control information relating to nested bounding spheres of triangular faces in the database, they may be pre-calculated at compile time. Then, it may in particular not be necessary to calculate the nested bounding spheres at run time in order to predict the visibility of an associated triangular face. This may reduce the required computational resources significantly. Then the rendering performance of a 3D electronic map view may be increased.

Furthermore, the navigation device may comprise a working memory, wherein, if the processor predicts that a certain triangular face is visible, the processor is configured to load from the database the tile comprising the certain triangular face into the working memory. By selectively loading into the working memory the data corresponding to the tiles only if the constituting triangular faces are predicted to be visible in the electronic map view, the required amount of working memory may be significantly reduced. Typically, the amount of data needed for defining the tiles and the associated TINs is significantly larger than the control information corresponding to the nested bounding spheres. It may then be possible to predict the visibility of a certain triangular face before the associated tiling data of this certain triangular face is actually loaded into the working memory. This may be done on the basis of the control information only, which requires a smaller amount of working memory. In contrast to the memory used for storing the database, the working memory may comprise volatile memory. Volatile memory typically has increased read and write speeds at the cost of volatility.

Also, the navigation device may comprise a graphical processor which may be configured to render the electronic map view based on the virtual camera position and the viewing angle, such that it comprises a terrain representation based on the 3D surfaces defined by those tiles which are loaded into the working memory. The graphical processor, or graphical processing unit (GPU), may be a separate entity or may be part of the processor. Moreover, it may use the same working memory as the processor or may use different working memory, which then may be coupled to the working memory of the processor.

When the electronic map view is rendered based on the tiles loaded into the working memory, this means that for rendering the electronic map view only those tiles are taken into account which are actually visible. By doing so, it may be possible to further reduce the required computational efforts. For example, tiles which are hidden in the electronic map view behind an obstacle, for example a large mountain, and are therefore not visible, may not be taken into account when rendering the electronic map view.

The database may store for each tile two TINs, wherein in a first TIN each tile comprises two triangular faces and in a second TIN each tile comprises four triangular faces, and wherein the triangular faces of the second TIN is a substructure of the triangular faces of the first TIN.

By providing a first and a second TIN with a different number of triangular faces, it may be possible to have these first and second TINs associated with a high resolution and a low resolution TIN. The high resolution TIN may comprise a larger number of triangular faces, for example four triangular faces, than the low resolution TIN, which, for example, may comprise two triangular faces. By providing different TINs for each tile, the flexibility in rendering a graphical terrain representation in the electronic map view may be increased.

In particular, when the triangular faces of the second TIN are substructures of the triangular faces of the first TIN, the second TIN may be a child of the first TIN. This means that the triangular faces of the second TIN may be derived from the triangular faces of the first TIN. By having two TINs in such a relation to each other, it may become relatively easy to calculate the nested bounding spheres for the two TINs.

Also, the graphical processor may be configured to render the electronic map view such that, depending on a threshold comparison of the distance between a tile and the virtual camera position, either the first or the second TIN is used for calculating the respective terrain representation. Then, if, e.g., tiles which have a large distance to the virtual camera position are rendered such that the first TIN, corresponding to a low resolution TIN only comprising two triangular faces, is used for rendering, the computational efforts required for rendering may be reduced. Typically, if the distance between a triangular face and the virtual camera position is large, the triangular face may appear very small on a screen in the electronic map view only. Then it may be possible to use a low resolution TIN because of the small representation.

The navigation device may comprise an optical output unit which is coupled to the graphical processor and configured to display the electronic map view. The electronic map view may contain the digital terrain representation obtained from the tiling based on a digital elevation model and may also contain further information such as streets, roads, cities, rivers, indication of speed limits, indication of traffic, indication of an estimated arrival time, or route guidance related information.

The database used in the navigation device may be generated at a compile time prior to a run time, where the screen-space error is calculated and the visibility is predicted.

By generating the database which comprises the control information relating to the nested bounding spheres at compile time (i.e., at a time prior to the execution of the rendering process) it may be possible to reduce the computational resources needed at run time. Compile time may, for example, refer to the time during which the data stored in the database is generated (i.e., the tiling data and the control information from a digital elevation model). This generation of the data may be performed by a provider of the tiling data prior to providing of the navigation device containing the database to a user.

According to a further aspect, a method of generating a database is provided. The method comprises, based on a digital elevation model, calculating a plurality of tiles of a tiling, each tile comprising at least one triangulated irregular network (TIN), defining a three-dimensional surface via a plurality of triangular faces, wherein the 3D surfaces associated with the plurality of tiles model the digital elevation model. The method further comprises for a plurality of triangular faces, respectively calculating a nested bounding sphere and storing the plurality of tiles with the associated TINs and triangular faces and the associated nested bounding spheres in the database. If the database, according to the currently discussed aspect, is generated accordingly, it may be used in connection with a previously discussed aspect of the invention. In particular, it may become possible to calculate the bounding spheres at compile time. Then effects according to the effects as previously discussed may be achieved for the presently discussed aspect.

The nested bounding sphere may be calculated from edge points or corner points of a respective triangular face and from edge points or corner points of a triangular face which is adjacent to the respective triangular face in the tiling and belonging to a different tile. Then the bounding sphere may comprise the entire triangular face and the entire adjacent triangular face and have a minimum volume while fulfilling these constraints.

In particular, the plurality of tiles may be calculated such that for each triangular face of the plurality of triangular faces there is one adjacent triangular face belonging to a different tile, wherein these two triangular faces share two edge points or corner points and one hypotenuse.

Then, each tile of the plurality of tiles may comprise two TINS, wherein in a first TIN each tile comprises two triangular faces and in a second TIN each tile comprises four triangular faces and wherein the triangular faces of the second TIN substructure the triangular faces of the first TIN. This has been discussed in connection with a further aspect of the invention. In particular, the second TIN may be derived from the first TIN.

In such a case, the nested bounding spheres may be calculated following rules selected from the rule including a nested bounding sphere of a certain triangular face of the first TIN comprises a nested bounding sphere of a triangular face of the second TIN substructuring the certain triangular face, and two triangular faces of different tiles and sharing a hypotenuse have the same nested bounding sphere which encloses both triangular faces. In such a case, the calculation of the nested bounding spheres may require particularly few computational resources. For example, a nested bounding sphere of a certain triangular face of the first TIN may be calculated using the nested bounding spheres of triangular faces of the second TIN being children of the certain triangular face of the first TIN.

According to a further aspect of the invention, a method of predicting a visibility of a triangular face in an electronic map view is provided. The method according to this aspect comprises retrieving, for a plurality of tiles of a tiling, at least one triangulated irregular network (TIN) defining a three-dimensional surface, and, for a plurality of triangular faces of the at least one TIN, control information defining a nested bounding sphere for the respective triangular faces. The method further comprises calculating a screen-space error for the plurality of triangular faces based on a respective control information and based on at least one of the following: a viewing angle of the electronic map view, a virtual camera position of the electronic map view, and, based on the calculated screen-space error, predicting the visibility of the plurality of triangular faces in the electronic map view. For such a method, effects as discussed with respect to a further aspect of the present invention may be obtained.

These and other objects, features and advantages of the present invention will become apparent in light of the detailed description of the embodiments thereof, as illustrated in the accompanying drawings. In the figures, like reference numerals designate corresponding parts.

DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Figure 1:
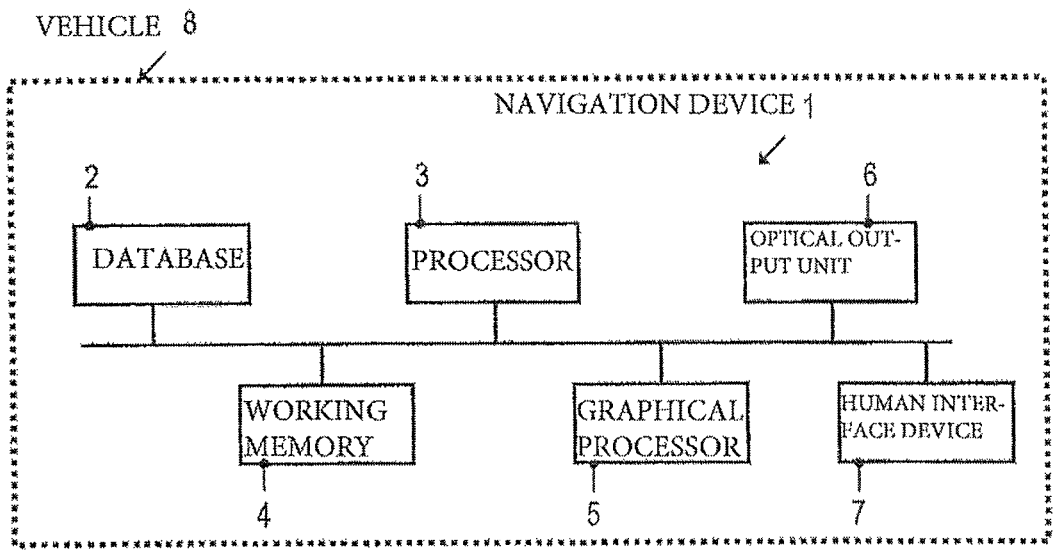
FIG. 1 is a schematic block diagram illustration of a navigation device.

FIG. 1 schematically illustrates a navigation device 1 according to an embodiment. The navigation device 1 can be arranged on board of a vehicle 8 or the like and, therefore, can have a time-varying location. The navigation device 1 comprises a processor 3 controlling the operation of the navigation device 1. The processor 3 may comprise a central processing unit, for example in form of one or more microprocessors, digital signal processors, or application-specific integrated circuits. The processing device 3 may also include a graphical processor 5, which, in the embodiment of FIG. 1, however, is illustrated as a separate unit. The graphical processor 5 is configured to control the optical output of various data, but including a 3D electronic map view, on an optical output device 6 (e.g., a display). To this end, the graphical processor 5 renders the map view including terrain representation.

In particular, the processor 3 and the graphical processor 5 are coupled to a working memory 4. The working memory 4 can be in the form of random access memory, which allows for rapid data access at the cost of volatility of stored data. For example, the working memory 4 can be shared by the graphical processor 5 and the processor 3, or can be in the form of separate units for the graphical processor 5 and the processor 3. In either way, the working memory 4 is necessary to perform processing steps such as the rendering of the 3D electronic map view.

The navigation device 1 also includes a database 2. The database 2 is stored in a storage device providing non-volatile storage over an extended period of time. Typically the storage device provides storage of data over the duration of operation of, e.g., the vehicle 8. The storage device 3 may comprise any one, or any combination, of various types of durable memory, such as flash memory or a hard drive, but also removable memories such as a compact disk (CD), a DVD, a memory card or the like. The database 2 includes data for a plurality of tiles at least one triangular network (TIN).

In particular, the database 2 stores data for each tile of a tiling. Such data comprises TIN data and bounding sphere data. The data structure and the data content will be discussed in greater detail with respect to FIG. 5 below. Bounding sphere data or control information, which is generated at compile time, is used to predict the visibility of a certain triangular face when rendering an electronic map view at run time. For example, when predicting the visibility of a certain triangular face at run time, it is not necessary to load TIN data for all tiles into the working memory 4. It is only necessary to load the control information into the working memory 4. This reduces the memory requirements, because the bounding sphere data (i.e., the control information) occupies typically a smaller fraction of the working memory 4 than the TIN data. Moreover, it is not necessary to calculate each bounding sphere data at run time. This greatly reduces the required computational requirements.

The nested bounding spheres are defined such that a nested bounding sphere comprises all points of a certain triangular face and all points within a triangular face adjacent to the certain triangular face but belonging to a different tile. The tiling as stored in the database 2 is defined such that each triangular face has one adjacent triangular face belonging to a different tile sharing two edge points and one hypotenuse.

These two triangular faces being adjacent and sharing a hypotenuse are fully comprised within one nested bounding sphere. At the same time, the nested bounding sphere has the minimum possible volume which still encloses those two triangular faces.

Also, the database 2 contains two TINs per tile. This means that for each tile, two levels of detail for which the DEM is approximated are provided via a high resolution TIN and a low resolution TIN. Each high resolution TIN comprises more triangular faces, e.g. four, than a low resolution TIN which, e.g., includes two triangular faces per tile. When rendering the 3D electronic map view, the graphical processor (GPU) 5 determines the distance of a certain tile to a virtual camera position. Based on a threshold comparison of this distance, the GPU either uses the low or high resolution TIN for rendering a graphical terrain representation of the particular tile. For example, for tiles having a small (large) distance to the virtual camera position, the high resolution (low resolution) TIN is used. Of course, more than two TINs can be provided per tile.

Moreover, the high resolution TIN and the low resolution TIN are related to each other. For example, each triangular face belonging to the high resolution TIN is comprised within a triangular face of the low resolution TIN. In other words, the triangular faces defining the high resolution TIN are derived from the triangular faces defining the low resolution TIN. Then, the high resolution TIN is referred to as a child of the low resolution TIN. In the case of the embodiment as depicted in FIG. 1, the high resolution TIN comprises four triangular faces while the low resolution TIN comprises only two triangular faces. The two triangular faces of the low resolution TIN are subdivided in order to yield two triangular faces which form the 2+2=4 triangular faces of the high resolution TIN.

Because the high resolution TIN is a child of the low resolution TIN as set forth above, it is possible to calculate the bounding spheres belonging to the low resolution TIN from the bounding spheres of the high resolution TIN at compile time. This will be explained in greater detail with respect to FIG. 9. In practice, a bounding sphere belonging to a certain triangular face belonging to the low resolution TIN fully comprises the bounding spheres of the triangular faces of the high resolution TIN which are obtained by subdividing the certain triangular face of the low resolution TIN.

The navigation device 1 also includes an optical output unit 6. The navigation device 1 can include additional components, such as a position sensor and/or a wireless receiver and/or a human interface device 7. Even though the different entities of FIG. 1 have been discussed separately, it should be understood that different entities can be combined in one unit. Different entities can be implemented as hardware or software or a combination thereof.

Figure 2:
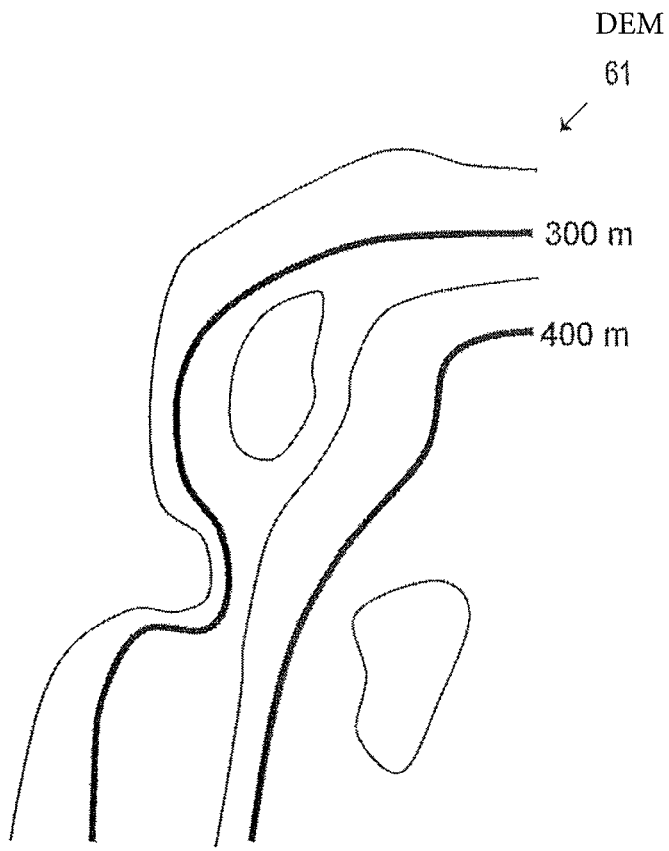
FIG. 2 is a schematic illustration of DEM data.

In FIG. 2 a digital elevation model (DEM) 61 is illustrated. Different height contours specify the elevation levels of a terrain. Such a DEM 61 is typically commercially available. However, such data cannot be used directly to obtain a graphical representation of the terrain in a 3D electronic map view. It is in practice not possible to render a 3D electronic map view at run time from the DEM 61. Rather, the DEM raw data is converted into 3D surfaces and the 3D surfaces are stored in the form of a tiling comprising tiles.

Figure 3:
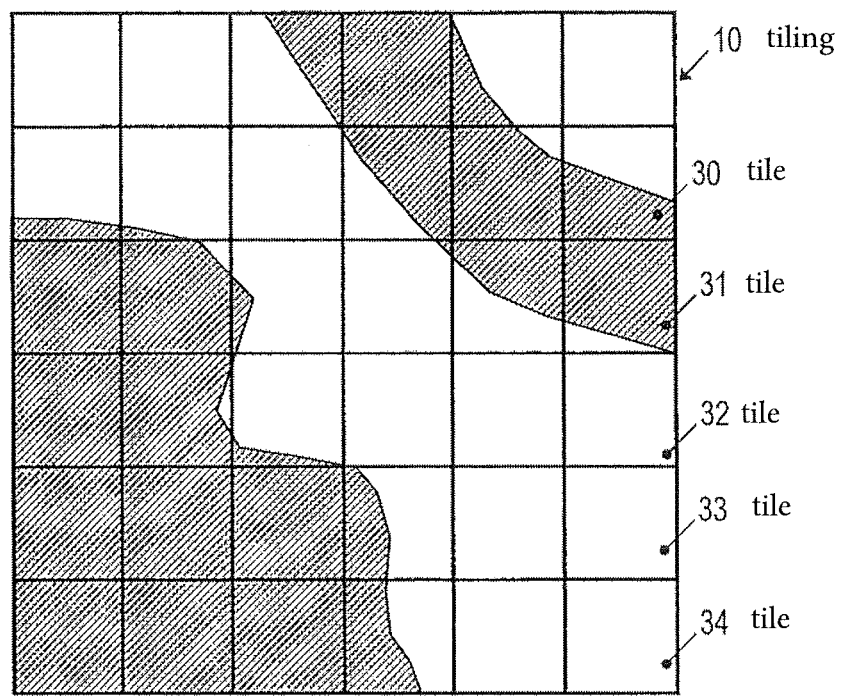
FIG. 3 is a plan view of a terrain with a superimposed tiling.

FIG. 3 is a schematic plan view of a terrain for which a tiling 10 is defined. The tiling 10 comprises a number of tiles 30-34. The terrain may extend over various elevation levels, as schematically indicated by shaded areas. Shaded areas may be at one elevation level, such as sea level, while non-shaded areas may be at another elevation level.

The 3D surface structure of the terrain may, at least to a good approximation, be represented by the TIN(s) defined for each tile. TINs show good performance when rendering the surface structure at run time.

Figure 4:
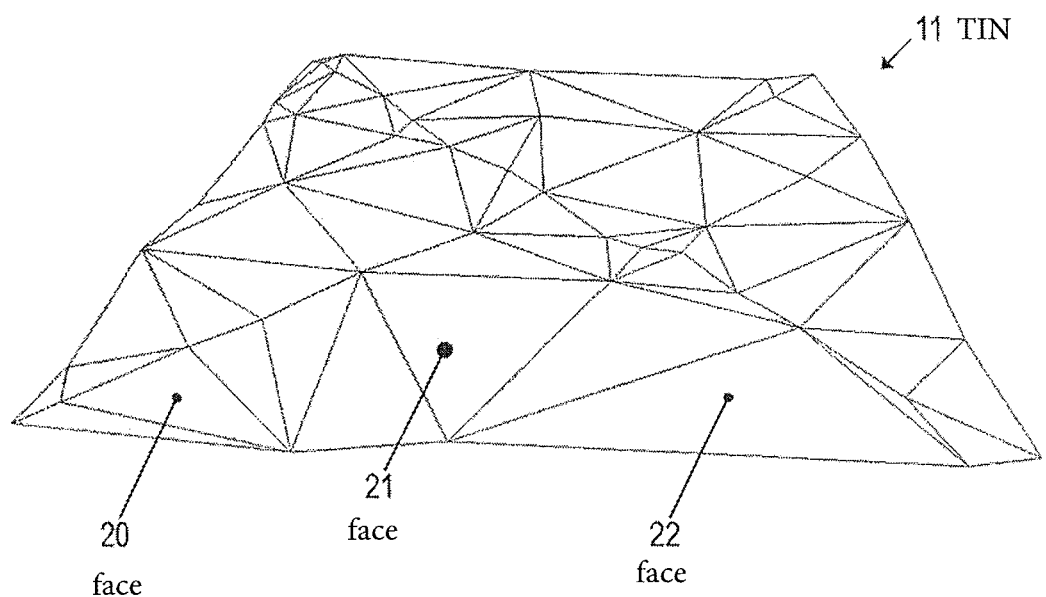
FIG. 4 is a perspective view illustrating a TIN for a tile.

FIG. 4 is a schematic perspective view illustrating the TIN 11 defined on a tile. The TIN includes a plurality of triangular faces 20-22. Via the known elevation of each edge point or corner point of the triangular faces 20-22, a 3D surface is specified via the TIN 11 comprising the triangular faces 20-22. In particular, the 3D surface models the DEM raw data as discussed with respect to FIG. 2 above.

In practice, the tiling comprising one or more TINs per tile and, for each TIN, two or more triangular faces is calculated at compile time. For example, the manufacturer of the map data and/or the navigation device calculates this content from DEM data and stores it permanently on the database 2 as discussed with respect to FIG. 1. At run time, some tiles of the tiling are loaded from the database 2 into the working memory 4 and used for, amongst others, rendering the 3D electronic map view.

Figure 5:
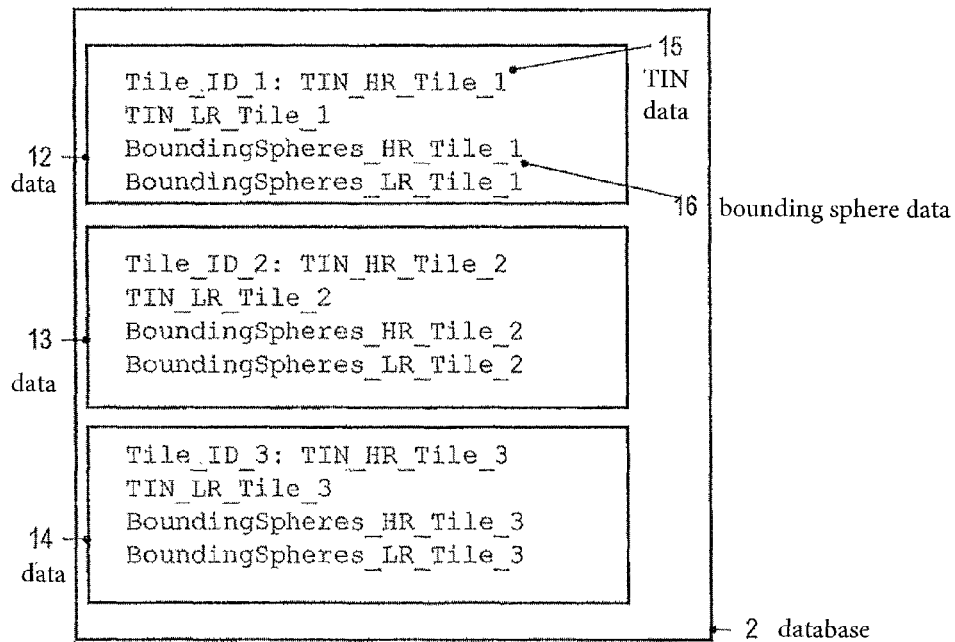
FIG. 5 is an illustration of data stored in a database.

The structure of the database 2 and the contained data is illustrated further in FIG. 5. The data 12-14 relating to three tiles with identification numbers 1, 2, and 3 is depicted. For example the data 12-14 can relate to the tiles 30, 31, and 32 of FIG. 3. Each of the data 12-14 comprises two associated TIN data 15, in particular a high resolution (HR) TIN data and a low resolution (LR) TIN data.

The low resolution TIN data and the high resolution TIN data has been discussed with respect to FIG. 1. For each of the triangular faces associated with a certain TIN, the data 12-14 also contains control information in the form of bounding sphere data 16. As has been explained with respect to FIG. 1 and as will be explained in further detail with respect to FIG. 9, the bounding spheres defined by bounding sphere data 16 (see FIG. 6) are defined such that two triangular faces being adjacent and sharing a hypotenuse but belonging to different tiles have the same bounding sphere. This means that the number of bounding spheres is half as large as the number of triangular faces. In other words, the bounding sphere data 16 will be equal for two different triangular faces. While in the embodiment of FIG. 5 the bounding sphere data 16 is provided for each triangular face, it is also possible that the bounding sphere data is provided within the database 2 only once per two triangular faces and referenced to the two respective triangular faces.

The data 12-14 contained in the database 2 is generated at compile time. Then, the bounding sphere data 16 is used to enhance performance by predicting the visibility of a certain triangular face in an electronic map view at run time.

Figure 6:
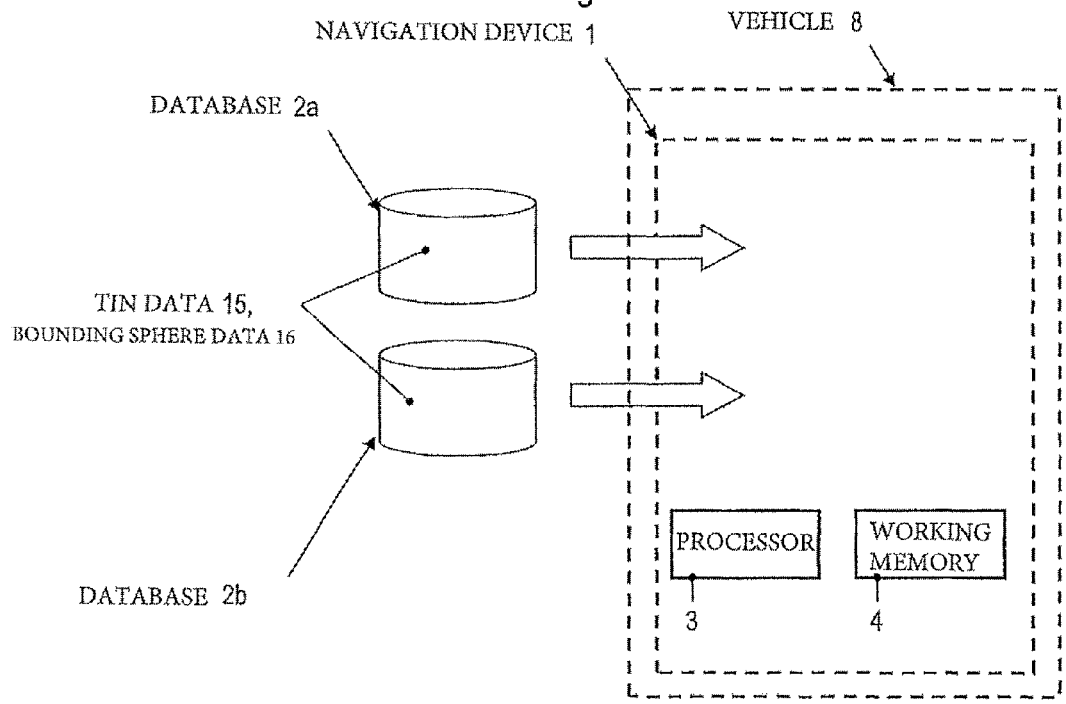
FIG. 6 is a schematic block diagram of a navigation device.

In FIG. 6 it is further illustrated how the generation of the databases is performed. In the case of FIG. 6, two databases 2a, 2b are generated at compile time. The first database 2a comprises the tiling data as discussed with respect to FIG. 5. The second database 2b comprises the associated bounding sphere data as discussed with respect to FIG. 6. The two databases contain references with respect to each other, such that the bounding sphere data can be linked to the tiling data and vice versa.

The databases 2a, 2b are generated at compile time. This means, in particular, that also the bounding sphere data is calculated for the various triangular faces at compile time. Then, they are loaded into some non-volatile storage in the vehicle 8, in particular in the navigation device 1. This is indicated by the vertical arrows. There they remain for many usage-cycles, possibly over the lifetime of the vehicle. The processor 3 and the working memory 4, as discussed with respect to FIG. 1, are coupled to the databases 2a, 2b.

Figure 7:
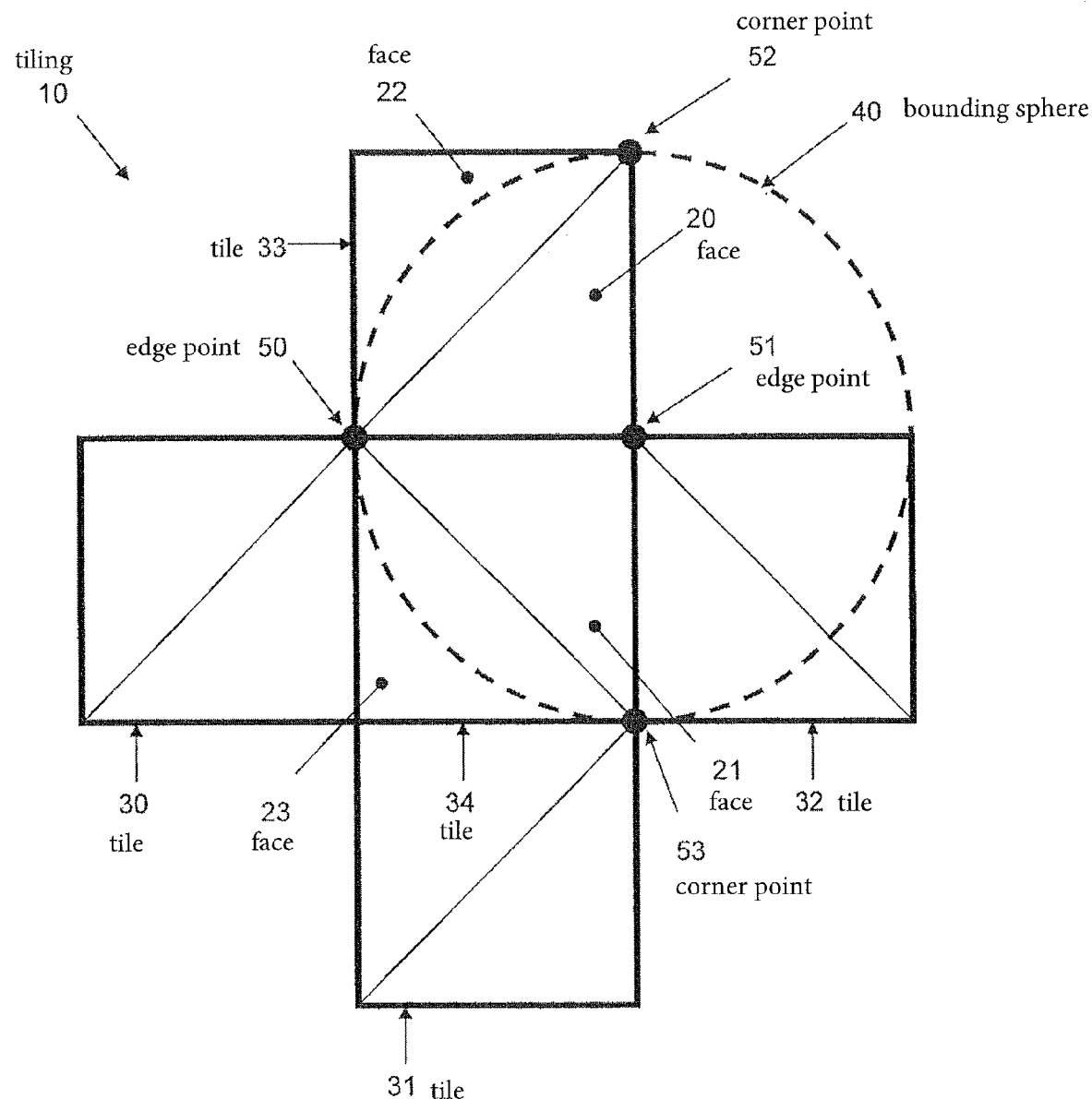
FIG. 7 is a plan view of a tiling, illustrating a nested bounding sphere.
Figure 8:
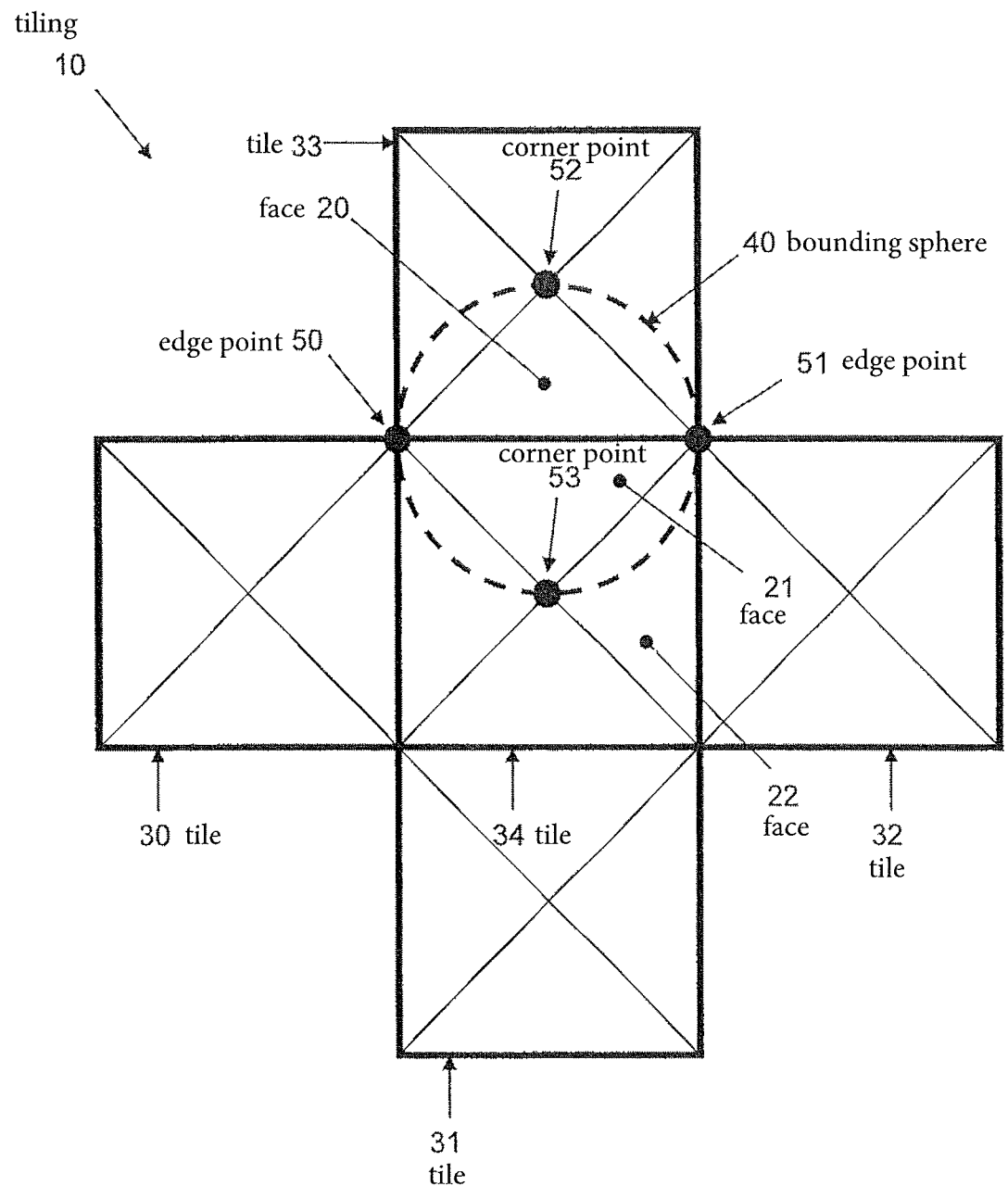
FIG. 8 is a plan view of a tiling, illustrating a nested bounding sphere.
Figure 9:
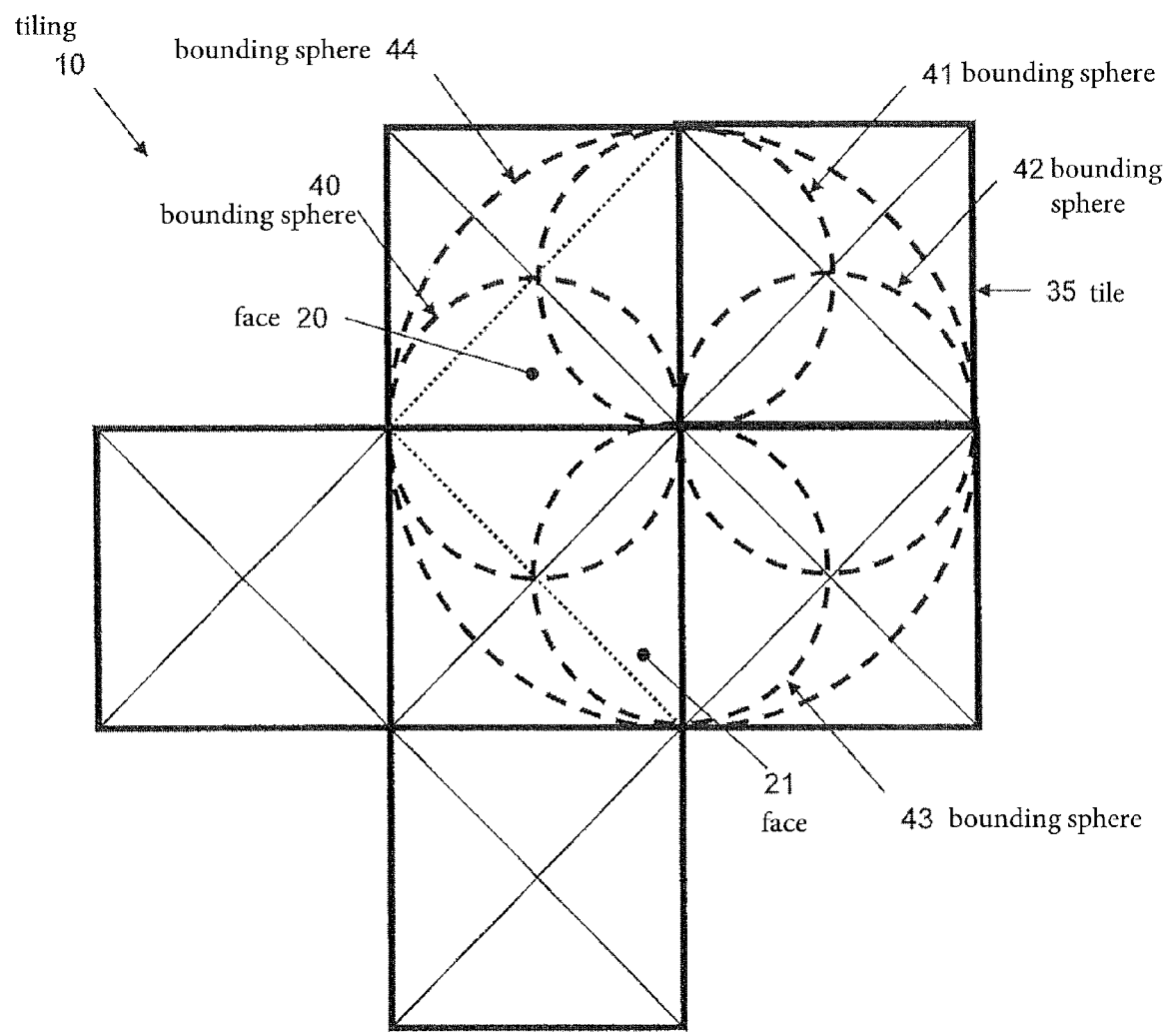
FIG. 9 is a plan view of two tilings, illustrating nested bounding spheres.

FIGS. 7-9 illustrate in further detail the properties of various TINs belonging to a tiling. With respect to FIG. 5 it was discussed that a tiling can be associated with different TINs, in the case of FIG. 5 the database contains a low resolution and a high resolution TIN per tile.

In FIG. 7, a tiling 10 comprising low resolution TINs is depicted. Each TIN (for each tile 30-34) comprises two triangular faces. The triangular faces 20, 22 belonging to tile 33 and triangular faces 21, 23, belonging to tile 34, are labelled in FIG. 7. As can be seen from FIG. 7 each low resolution TIN includes two triangular faces. The tiling 10 comprising low resolution TINs can be used, for example, for rendering the terrain representation of tiles which have a large distance to the virtual camera position in an electronic view.

The triangular face 20 is defined via corner points 50, 51, and 52. The triangular face 21, belonging to a different tile, is defined via the edge points or corner points 50, 51, and 53. Therefore, the triangular faces 20 and 21 share the edge points or corner points 50 and 51. Also, the hypotenuse, this means the connection between the edge point 50 and 51 is shared by the two triangular faces 20 and 21.

The bounding sphere 40, which is the sphere with minimum volume which still fully encloses the two triangular faces 20 and 21, is depicted with a dashed line in FIG. 7. The bounding spheres 40 are calculated at compile time, and can be used for predicting the visibility of the triangular faces 20 and 21 in an electronic map view without fully rendering the respective tiles 33 and 34. This because it is possible to use the bounding sphere 40 in order to calculate a screen-space error which then in turn can be used in order to predict the visibility of the triangular faces.

It should be understood that the bounding sphere 40 associated with the triangular faces 20 and 21 is the same, even though these triangular faces 20 and 21 are different. In particular, they also belong to different tiles 33 and 34.

In FIG. 8, the same tiling 10 as discussed with respect to FIG. 9 is shown. However, the tiling 10 is now shown with respect to high resolution TINs. Each tile 30-34 includes four triangular faces. Exemplarily, the triangular faces 20 and 21 belonging respectively to the tiles 33 and 34 are labelled in FIG. 8. Again, the triangular faces 20 and 21 belong to different tiles, but share two edge points 50, 51. Also, they share the hypotenuse which is defined as the connection between the edge points 50 and 51.

Depicted in FIG. 8 with a dashed line is the bounding sphere 40. As discussed with respect to FIG. 7, this bounding sphere is calculated at compile time and stored in the database 2 as discussed with reference to FIG. 1 for the two triangular faces 20 and 21.

As can be seen from FIG. 8, the TINs used for the different tiles 30-34 in FIG. 8 are children of the TINs as used for the tiles 30-34 with respect to FIG. 7. In other words, the high resolution TIN as depicted in FIG. 8 is derived from the low resolution TIN as depicted with respect to FIG. 7. For example, the triangular faces 21 and 22 as depicted in FIG. 8 for the high resolution TIN of the central tile 34 are obtained by subdividing the triangular face 21 of FIG. 7 (low resolution TIN of central tile 34). Because the high resolution TINs of FIG. 8 are children of the low resolution TINs of FIG. 7, it is possible to calculate the bounding spheres for the low resolution TIN from the bounding spheres of the high resolution TIN.

This is illustrated in FIG. 9, where the same tiling (additionally, a tile 35 is depicted in the upper right-hand side of FIG. 9) as for the FIGS. 7 and 8 is shown. Here, the bounding sphere 44, relating to the bounding sphere 40 of FIG. 7 is derived from the bounding spheres 41, 42, 40, and 43. The bounding spheres 40, 41, 42, 43 belong to the high resolution TIN, while the bounding sphere 44 belongs to the low resolution TIN. As can be seen, the bounding sphere 44 fully comprises the bounding spheres 40-43. This makes it possible, to calculate bounding sphere 44 at compile time from the bounding spheres 40-43.

Figure 10:
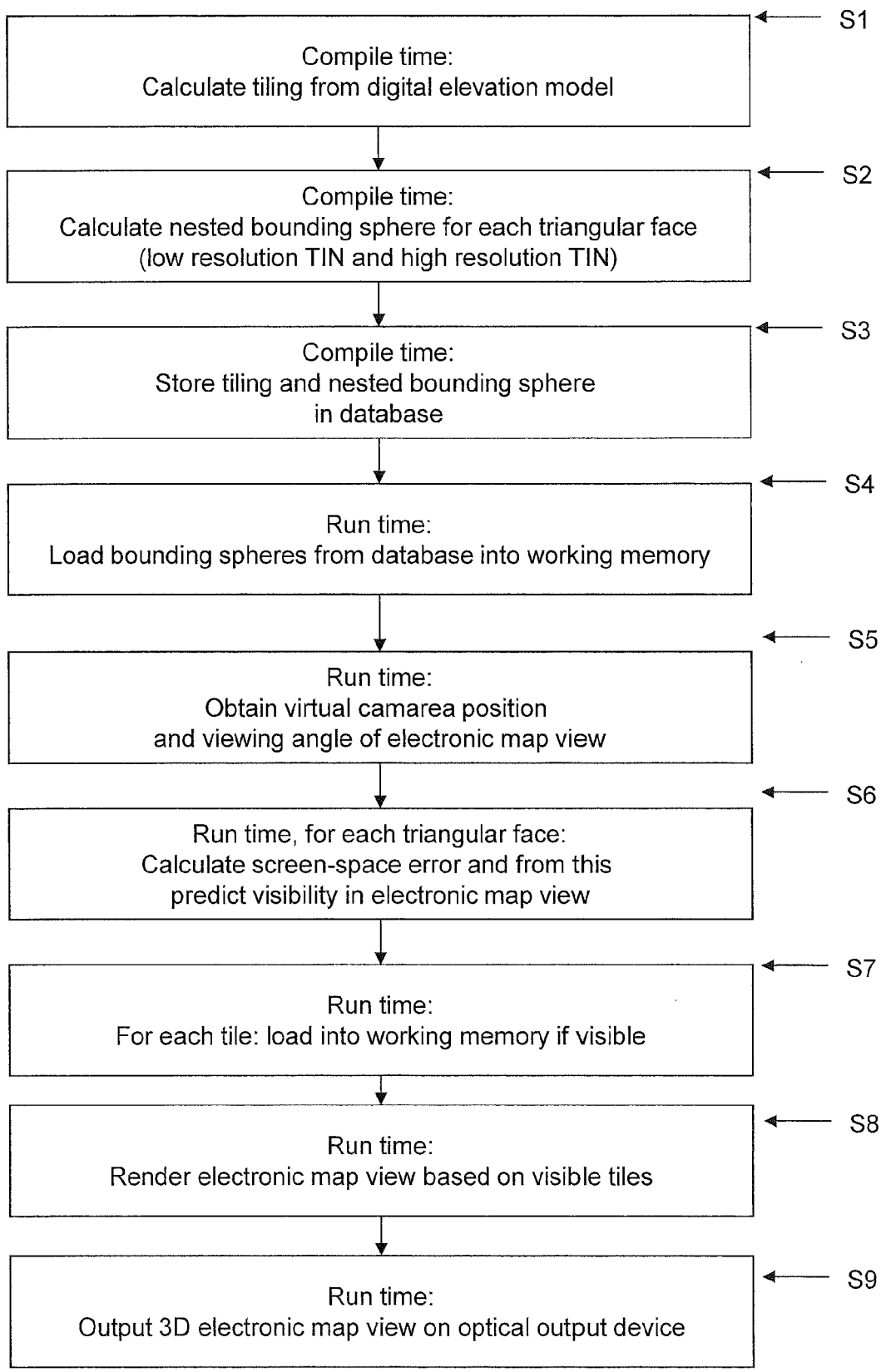
FIG. 10 is a flow chart of a method of predicting a visibility.

In FIG. 10 a flowchart illustrating an embodiment of a method for predicting the visibility is depicted. The method starts in step S1, where, at compile time, a tiling is calculated from a digital elevation model. This has been discussed with respect to FIGS. 2-4. It is possible to calculate for each tile two TINs. These TINs correspond to a low resolution TIN and a high resolution TIN as discussed with respect to FIGS. 7 and 8.

Then, in step S2 the nested bounding spheres are calculated for each triangular face belonging to the low resolution TIN and the high resolution TIN. Also step S2 occurs at compile time. For example, the performing of steps S1 and S2 can happen at the provider of the digital map data used to render the electronic map view.

Then, at step S3, the calculated tiling and the calculated nested bounding spheres are stored in a database in the form of TIN data and control information as discussed with respect to FIG. 5. The database is provided on a non-volatile memory. This has been discussed with respect to FIG. 1.

In step S4, at run time the control information is loaded into a working memory from the database at run time. The working memory may be accessed and coupled to a graphical processing unit (GPU). The GPU or another processor controls the loading of the control information into the working memory.

Also, the GPU provides a virtual camera position and a viewing angle relating to the electronic map view which is prepared by the GPU in step S5.

Then, in step S6, for each triangular face for which in step S4 the respective bounding sphere data has been loaded into the working memory, a screen-space error is calculated and, using the screen-space error, a visibility in the electronic map view is predicted. In particular, when calculating a screen-space error, parameters of the electronic map view such as the virtual camera position and the orientation of the camera enter the calculation.

Then, if for a certain triangular face it has been predicted in step S6 that it will be visible in the rendered electronic map view, the tile data to which the triangular face belongs is loaded into the working memory. Typically, tile data comprising the geometric definitions of the tiles and the associated TINs is much larger than the bounding sphere data which has been used in step S6 in order to calculate the screen-space error. Thus, it is possible to reduce the required working memory as only those tiles are loaded into the working memory which are necessary in step S8 to render the electronic map view.

Last, in step S9 the electronic map view is output in some optical output device, for example a display.

Figure 11:
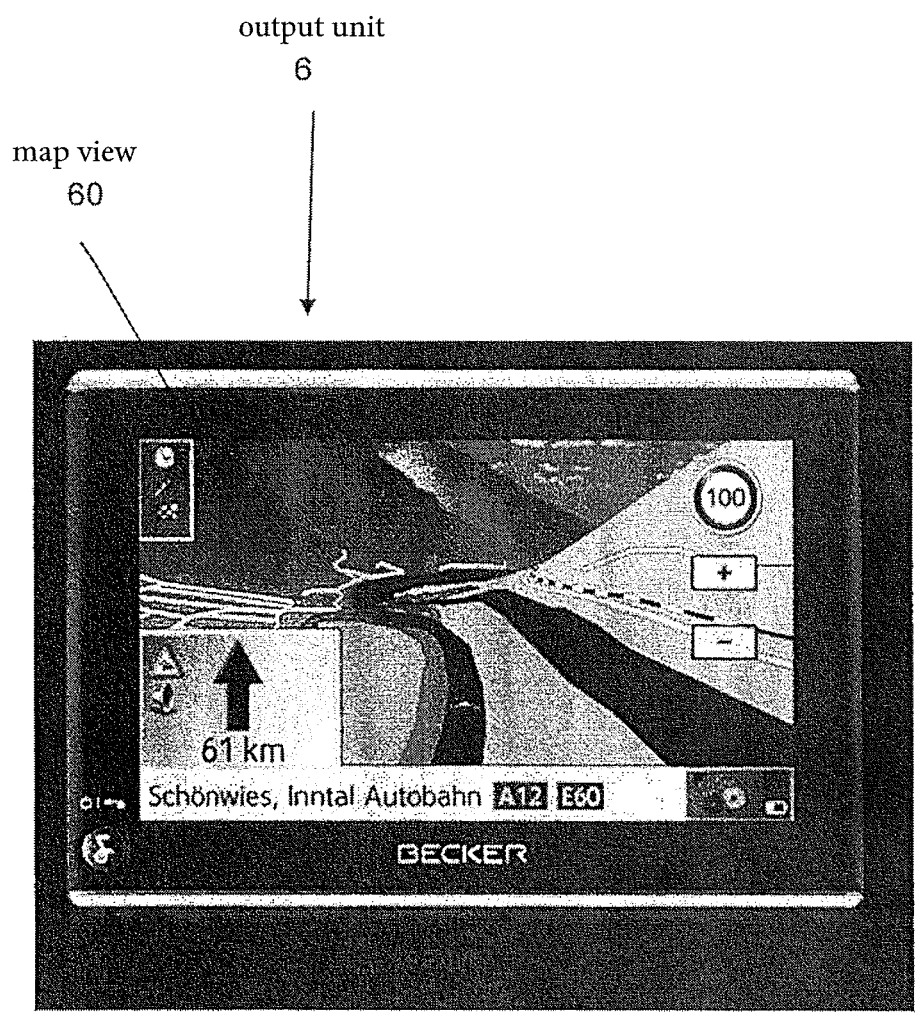
FIG. 11 is an image illustrating a 3D electronic map view including representation of terrain elevation.

In FIG. 11, an example of a 3D electronic map view 60 including terrain representation and output on an optical output unit 6 in the form of a display is depicted. Besides the elevation of e.g., mountains etc. other information such as roads, guiding directions, speed limits, and estimated arrival time, for example, is part of the electronic map view 60.

While methods and devices according to embodiments have been described in detail, modifications may be implemented in other embodiments. For example, it is possible to only store once nested bounding spheres for adjacent triangular faces belonging to different tiles and provide the appropriate references. It is also possible to provide more than two TINs per tile.

Although the present invention has been illustrated and described with respect to several preferred embodiments thereof, various changes, omissions and additions to the form and detail thereof, may be made therein, without departing from the spirit and scope of the invention.

What is claimed is:

1. A navigation device for a vehicle, comprising:
   a database that stores for a plurality of tiles of a tiling, at least one triangulated irregular network (TIN) defining a three-dimensional surface, and stores, for a plurality of triangular faces of the at least one TIN, control information defining a nested bounding sphere for the respective triangular faces, wherein the database stores for each tile two TINs, and each tile comprises two triangular faces of a first TIN and each tile comprises four triangular faces of a second TIN, and wherein the triangular faces of the second TIN are substructures of the triangular faces of the first TIN;
   a processor coupled to the database and configured to calculate a screen-space error for the plurality of triangular faces based on the respective control information and based on at least one of the following (i) a viewing angle of an electronic map view or a (ii) virtual camera position of the electronic map view, and predict whether a triangular face is visible in the electronic map view based on the calculated screen-space error;
   a working memory, wherein, if the processor predicts that a certain triangular face is visible, the processor is configured to load the tile comprising the certain triangular face into the working memory from the database; and
   a graphical processor configured to render the electronic map view based on the virtual camera position and the viewing angle such that it comprises a terrain representation based on the three-dimensional surfaces defined by those tiles loaded into the working memory, wherein the graphical processor is configured to render the electronic map view such that, depending on a threshold comparison of a distance between a tile and the virtual camera position, either the first or the second TIN is used for calculating the respective terrain representation.

2. The navigation device of claim 1, further comprising a display coupled to the graphical processor and configured to display the electronic map view.

3. A method of predicting a visibility of a triangular face in an electronic map view, comprising:
   retrieving, from a database, for a plurality of tiles of a tiling, at least one triangulated irregular network (TIN) defining a three-dimensional surface; and
   for a plurality of triangular faces of the at least one TIN, control information defining a nested bounding sphere for the respective triangular faces, wherein the database stores for each tile two TINs, wherein each tile comprises two triangular faces of a first TIN and each tile comprises four triangular faces of a second TIN, and wherein the triangular faces of the second TIN are substructures of the triangular faces of the first TIN;
   calculating by a processor a screen-space error for the plurality of triangular faces based on the respective control information and based on at least one of the following (i) a viewing angle of the electronic map view (ii) a virtual camera position of the electronic map view;
   based on the calculated screen-space error, predicting the visibility of the plurality of triangular faces in the electronic map view;
   if it is predicted that a certain triangular face is visible in the electronic map view, loading from a database the tile comprising the certain triangular face into a working memory; and
   rendering the electronic map view based on the virtual camera position and the viewing angle such that it comprises a terrain representation based on the three-dimensional surfaces defined by those tiles which are loaded into the working memory, wherein, depending on a threshold comparison of a tile and the virtual camera position, either the first TIN or the second TIN is used for calculating the respective terrain representation.

* * * * *